(12) United States Patent
Frenzel et al.

(10) Patent No.: US 6,673,452 B1
(45) Date of Patent: Jan. 6, 2004

(54) FIBER-COMPOSITE MATERIAL AND A METHOD FOR PRODUCING THE SAME

(75) Inventors: Horst Frenzel, Dresden (DE); Andrzej Bledzki, Ahnatal (DE); Andreas Kessler, Ludwigshafen (DE)

(73) Assignee: Institut fur Polymerforschung Dresden E.V., Dresden (DE)

( * ) Notice: Subject to any disclaimer, the term of this patent is extended or adjusted under 35 U.S.C. 154(b) by 0 days.

(21) Appl. No.: 10/019,296

(22) PCT Filed: Jun. 26, 2000

(86) PCT No.: PCT/DE00/02144

§ 371 (c)(1),
(2), (4) Date: Apr. 19, 2002

(87) PCT Pub. No.: WO01/02164

PCT Pub. Date: Jan. 11, 2001

(30) Foreign Application Priority Data

Jul. 5, 1999 (DE) .......................................... 199 32 274

(51) Int. Cl.$^7$ .............................................. B32B 27/38
(52) U.S. Cl. .................. 428/413; 428/417; 428/297.4; 428/300.1; 428/297.1; 428/300.7
(58) Field of Search ................. 428/413, 417, 428/295.1, 297.1, 300.1, 300.7, 310.5, 296.4

(56) References Cited

U.S. PATENT DOCUMENTS

| 3,943,090 A | 3/1976 | Enever |
| 5,025,045 A | 6/1991 | Gawin et al. |
| 5,089,560 A | 2/1992 | Gardner et al. |

FOREIGN PATENT DOCUMENTS

| DE | 3223689 | 1/1984 |
| DE | 3224689 | 1/1984 |
| DE | 3329127 | 2/1985 |
| DE | 19738388 | 2/1998 |
| DE | 19734417 | 12/1998 |
| EP | 0056427 | 7/1982 |
| EP | 0087311 | 8/1983 |
| EP | 0099338 | 1/1984 |
| EP | 0392348 | 10/1990 |
| WO | 86/05445 | 9/1986 |

OTHER PUBLICATIONS

Bucknall, C.B. et al., The British Polymer Journal, vol. 15, Mar. 1983, pp. 71–75.
Jang et al., Composites Science and Technology, 34 (1989) pp. 305–335.
Schichert et al., Acta Polymerica, 38(1987) Nr. 10, pp. 562–566.
Hayes et al., Journal of Advanced Materials, 28(1997) 4, pp. 20–25.
Pethrick et al., Macromolecules 29 (1966) 15, pp. 5208–5214.
DIN EN ISO 6603, 16 pages of document.

Primary Examiner—Robert Dawson
Assistant Examiner—Christopher Keehan
(74) Attorney, Agent, or Firm—Greenblum & Bernstein, P.L.C.

(57) ABSTRACT

The invention relates to the field of chemistry and to a fiber composite material which is used, for example, in aircraft. The invention provides a fiber composite material in which delamination can be significantly reduced. This is achieved by a fiber composite material with multiple layers, each containing a duromer matrix and reinforcing fibers, inner layers contain fibers featuring a high level of adhesion to the duromer matrix, outer layers contain fibers featuring a low level or no adhesion to duromer matrix. There is also provided a method in which the reinforcing fibers include a coating and the layers are structured in such a way that, on the interior of the fiber composite material, layers are arranged which contain fibers with a high level of adhesion to the duromer matrix and that outer layers which contain fibers with a lower or low level of adhesion, or no adhesion to the duromer matrix are arranged on and/or around these inner layers.

17 Claims, No Drawings

FIBER-COMPOSITE MATERIAL AND A METHOD FOR PRODUCING THE SAME

FIELDS OF APPLICATION OF THE INVENTION

The invention relates to the fields of mechanical engineering and chemistry and refers to a fiber composite material of the type that can be used, e.g., in aircraft and automobiles, and a method for producing the same.

DISCUSSION OF BACKGROUND INFORMATION

As lightweight materials, fiber composites are exposed to the most varied stresses, but are intended to largely retain their original properties. Among mechanical stresses, dynamic stresses are important, particularly impact stress, as they have a fundamental influence on the durability of the composite material. Thus in multilayer composites the formation of matrix tears and large-area delaminations can occur between layers with different fiber orientation during shock loading perpendicular to the laminate surface. Delaminations in particular should be considered critical damage, since they can easily continue to grow under dynamic material stress, and with compressive load they can lead to buckling of individual layers and thus to the failure of the workpiece.

It is known to reduce the above-mentioned damage during shock loading by giving the mostly very brittle duromer matrix resins, e.g., epoxy resin, a higher fracture toughness by the addition of modifying agents. This is accomplished with various types of modifications.

Flexibilization by the addition of long-chained plasticizers or by the inclusion of long-chained segments in the resin structure (Schichert, P., Rühlmann, K., Acta Polymerica 38 (1987) 10, p. 562–566).

Dispersion of a small amount of a functionalized elastomer, a polyurethane or a silicone compound in the resin matrix, forming a separate phase (EP 056427, DE 32 24 689 A1, EP 087311, U.S. Pat. No. 5,089,560, U.S. Pat. No. 5,025,045, Hayes, B. S. et al., J. Adv. Mater. 28 (1997) 4, p. 20–25)

Modification of the duromer resins by the addition of thermoplastics, e.g., polyethersulfone or polyetherimide (EP 099338, EP 392348, Pethrick, R. A., et al., Macromolecules 29 (1996) 15, p. 5208–14, Bucknall, C. B. et al., Brit. Polym. J. 15(1993)1, p. 71–75)

The disadvantages of these modifications are increased product costs and a more or less severe reduction in the stiffness and the temperature stability of the composites.

Another possibility for increasing the impact strength of composites is the use of hybrid fiber materials as reinforcing fibers, such as, e.g., hybrid fibers of C- or glass fibers with polyethylene, aramid or polyester fibers (Jang et al. Compos. Sci. Technol. 34(1989)4, p. 305–335).

The disadvantages of this modification are also the expensive production of hybrid filaments and the deterioration of the composite properties, particularly strength and stiffness.

SUMMARY OF THE INVENTION

The invention is based on the objective of identifying a fiber composite material and a method for producing the same where substantially reduced delamination is achieved without a significant reduction in other composite properties and without substantial economic disadvantages.

The present invention provides fiber composite material comprising multiple layers, each of the multiple layers containing a duromer matrix and reinforcing fibers, inner layers of the multiple layers containing fibers featuring a higher level of adhesion to duromer matrix, outer layers of the multiple layers containing fibers featuring a lower level or no adhesion to duromer matrix, a number of outer layers being no more than a number of inner layers, and a transition of adhesion between fibers and matrix from the inner to the outer layers being discontinuous or continuous.

The present invention also provides a process for manufacturing a fiber composite material of a multilayered structure, comprising inner layers containing reinforcing fibers featuring a high level of adhesion to duromer matrix and outer layers containing reinforcing fibers featuring a low level or no adhesion to duromer matrix, the process comprising coating the reinforcing fibers, the coating comprising a higher proportion of adhesion promoters for fibers that are to have a higher level of adhesion to the duromer matrix, and the coating comprising a lower or no proportion of at least one of adhesion promoters and additional materials for fibers that are to have a lower level or no adhesion to the duromer matrix, adding the coated fibers separately to a duromer matrix and processing into layers such that layers with fibers with a higher level of adhesion to the duromer matrix are interiorly arranged in the fiber composite material as inner layers, and outer layers are arranged at least one of on and around these inner layers, the outer layers comprising fibers with a lower, low or no adhesion to the duromer matrix, with a discontinuous or continuous structure being employed for the adhesive effect, and forming the fiber composite material wherein a number of the outer layers is no more than a number of the inner layers.

The reinforcing fibers can comprise at least one of silicate fibers and carbon fibers. The silicate fibers can be glass fibers.

The reinforcing fibers can have a coating that generates a good or poor adhesion to the duromer matrix.

The coating can contain an increasing proportion of adhesion promoter with increasing adhesion.

The coating can contain at least one of additional elasticizing components and antiadhesive substances with decreasing adhesion.

The inner layers can be completely enclosed by the outer layers.

The outer layers can be arranged around the inner layers in a symmetrical structure.

The transition of adhesion between fibers and matrix from the inner to the outer layers can be a graduated transition of layers with fibers with good adhesion from inside to outside to layers with fibers with poorer adhesion.

The fibers can be provided with the coating during the fiber formation process.

The solution according to the invention renders possible the disclosure of fiber composite materials that in most cases feature a substantially lower delamination and thus are significantly less susceptible in particular to impact stress.

It is known that composites with good fiber-matrix adhesion are more damage-tolerant and feature lower evidence of delamination particularly under impact stress. However, they are also stiff and brittle.

It is also known that composites with poor adhesion can absorb in particular noticeably more energy as a result of boundary layer failure and fiber-matrix friction. However, they feature only a low level of strength.

According to the invention, both of these phenomena, which are known per se, are achieved together in one composite material, retaining the good qualities, but not the negative qualities.

Due to the structure of the fiber composite material according to the invention, the good and desired adhesion properties of the fibers with the duromer matrix are retained in the interior of the composite. Considerably greater energy absorption and energy distribution occur in the composite under stress—in particular impact stress—in the outer areas with lower or no adhesion of the fibers to the duromer matrix.

Overall, the strength of the composite as a whole is largely retained, without the composite becoming brittle. The tendency towards delamination of the composites according to the invention is noticeably lower.

The adhesive effect of the fibers in the duromer matrix can decrease discontinuously or continuously towards the outside. A continuous decrease is achieved by manufacturing fibers with coatings with a decrease in the amount of adhesion promoters in small steps and/or by adding elasticizing components and/or antiadhesive substances in small steps, using them to make one layer each, and then using a graduated construction in the production of the multilayer composite.

BEST WAY TO IMPLEMENT THE INVENTION

The invention is explained in more detail below on the basis of an example.

Glass fibers are used as reinforcing fibers. Here one group of glass fibers features a coating that has been applied during the fiber formation process and comprises a coat containing an aminosilane as an adhesion promoter. The other group of glass fibers features a coating that comprises polyethylene (without an adhesion promoter). These glass fibers are added separately to a duromer matrix made from the Araldit epoxy resin system LY556/HY917/DY070 (Ciba-Geigy) and processed into layers. The fiber volume amounts to a total of 58%. The dimensions of the layers are 60×60×2 mm.

These layers are then arranged on top of each other crosswise at an angle of 90°, creating an eight-ply layer-composite featuring the following structure regarding the adhesion between fibers and matrix:

A: gghhhhgg g—layer with fibers with low/no adhesion to the duromer matrix h—layer with fibers with good adhesion to the duromer matrix In comparison, fiber composites are made of glass fibers and epoxy resin according to the prior art. The layers are likewise arranged crosswise at an angle of 90°, first with only layers with a high level of adhesion between the fibers and the duromer matrix, and then with only layers with a low level of adhesion between the fibers and the duromer matrix being used, resulting in the following structure:

B: gggggggg

C: hhhhhhhh

After the fiber composite materials are produced, they are loaded with an impact strength of 7.5 J on an impact falling weight apparatus following DIN EN ISO 6603. Then a magnetic planimeter is used to determine the projected delamination spread in the individual materials.

The results are as follows:

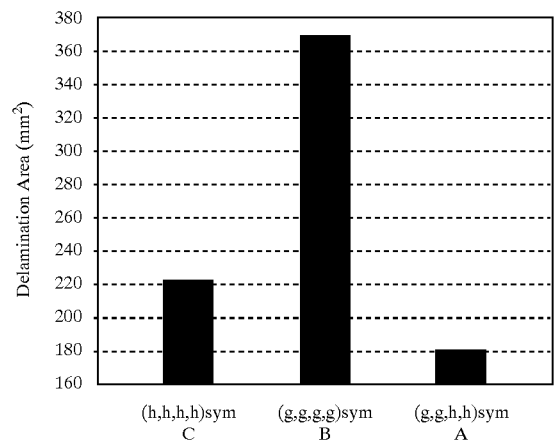

This shows that the structure according to the invention exhibits the smallest delamination area.

What is claimed is:

1. Fiber composite material comprising multiple layers, each of said multiple layers containing a duromer matrix and reinforcing fibers, inner layers of said multiple layers containing fibers featuring a higher level of adhesion to duromer matrix, outer layers of said multiple layers containing fibers featuring a lower level or no adhesion to duromer matrix, a number of outer layers being no more than a number of inner layers, and a transition of adhesion between fibers and matrix from the inner to the outer layers being discontinuous or continuous.

2. Fiber composite material according to claim 1, wherein said reinforcing fibers comprise at least one of silicate fibers and carbon fibers.

3. Fiber composite material according to claim 2, wherein said silicate fibers are glass fibers.

4. Fiber composite material according to claim 1, wherein said reinforcing fibers have a coating that generates a good or poor adhesion to the duromer matrix.

5. Fiber composite material according to claim 4, wherein said coating contains an increasing proportion of adhesion promoter with increasing adhesion.

6. Fiber composite material according to claim 4, wherein said coating contains at least one of additional elasticizing components and antiadhesive substances with decreasing adhesion.

7. Fiber composite material according to claim 1, wherein said inner layers are completely enclosed by the outer layers.

8. Fiber composite material according to claim 1, wherein said outer layers are arranged around the inner layers in a symmetrical structure.

9. Fiber composite material according to claim 1, wherein the transition of adhesion between fibers and matrix from the inner to the outer layers being discontinuous or continuous comprises a graduated transition of layers with fibers with good adhesion from inside to outside to layers with fibers with poorer adhesion.

10. Process for manufacturing a fiber composite material of a multilayered structure, comprising inner layers containing reinforcing fibers featuring a high level of adhesion to duromer matrix and outer layers containing reinforcing fibers featuring a low level or no adhesion to duromer matrix, said process comprising coating the reinforcing fibers, the coating comprising a higher proportion of adhesion promoters for fibers that are to have a higher level of adhesion to the duromer matrix, and the coating comprising a lower or no proportion of at least one of adhesion promoters and additional materials for fibers that are to have a lower level or no adhesion to the duromer matrix, adding the coated fibers separately to a duromer matrix and processing into layers such that layers with fibers with a higher level of adhesion to the duromer matrix are interiorly arranged in the fiber composite material as inner layers, and outer layers are arranged at least one of on and around these inner layers, the outer layers comprising fibers with a lower, low or no adhesion to the duromer matrix, with a discontinuous or continuous structure being employed for the adhesive effect, and forming the fiber composite material wherein a number of the outer layers is no more than a number of the inner layers.

11. Process according to claim 10 wherein the fibers are provided with the coating during the fiber formation process.

12. Process according to claim 10 wherein a coating used for fibers with no or a low level of adhesion to the duromer matrix contains at least one of additional elasticizing components and antiadhesive substances.

13. The process according to claim 10, wherein the reinforcing fibers comprise at least one of silicate fibers and carbon fibers.

14. The process according to claim 13, wherein the silicate fibers are glass fibers.

15. The process according to claim 10, wherein the inner layers are completely enclosed by the outer layers.

16. The process according to claim 10, wherein the outer layers are arranged around the inner layers in a symmetrical structure.

17. The process according to claim 10, wherein the transition of adhesion between fibers and matrix from the inner to the outer layers being discontinuous or continuous comprises a graduated transition of layers with fibers with good adhesion from inside to outside to layers with fibers with poorer adhesion.

* * * * *